(12) United States Patent
Depping

(10) Patent No.: US 9,754,707 B2
(45) Date of Patent: Sep. 5, 2017

(54) OVERVOLTAGE PROTECTION DEVICE

(71) Applicant: Phoenix Contact GmbH & Co. KG, Blomberg (DE)

(72) Inventor: Christian Depping, Lemgo (DE)

(73) Assignee: Phoenix Contact Gmbh & Co. KG, Blomberg (DE)

( * ) Notice: Subject to any disclaimer, the term of this patent is extended or adjusted under 35 U.S.C. 154(b) by 422 days.

(21) Appl. No.: 14/384,420

(22) PCT Filed: Mar. 12, 2013

(86) PCT No.: PCT/EP2013/000720
§ 371 (c)(1),
(2) Date: Sep. 11, 2014

(87) PCT Pub. No.: WO2013/135369
PCT Pub. Date: Sep. 19, 2013

(65) Prior Publication Data
US 2015/0103462 A1    Apr. 16, 2015

(30) Foreign Application Priority Data
Mar. 12, 2012   (DE) .......................... 10 2012 004 678

(51) Int. Cl.
*H01C 7/12* (2006.01)
*H02H 9/04* (2006.01)

(52) U.S. Cl.
CPC ............... *H01C 7/12* (2013.01); *H01C 7/126* (2013.01); *H02H 9/04* (2013.01)

(58) Field of Classification Search
CPC ............. H01C 7/10–7/126; H02H 9/04–9/044
See application file for complete search history.

(56) References Cited

U.S. PATENT DOCUMENTS

| | | | | |
|---|---|---|---|---|
| 4,015,228 A | * | 3/1977 | Eda ......................... | H01C 7/126 337/28 |
| 4,164,726 A | * | 8/1979 | Weibe ................. | H01H 85/0417 337/215 |

(Continued)

FOREIGN PATENT DOCUMENTS

| DE | 695 03 743 T2 | 3/1999 |
|---|---|---|
| DE | 10 2009 004 758 A1 | 12/2009 |

*Primary Examiner* — Stephen W Jackson
*Assistant Examiner* — Christopher Clark
(74) *Attorney, Agent, or Firm* — David S. Safran

(57) ABSTRACT

A surge protection device having a housing, two connections for connection to a current path to be protected, and at least a first discharge conductor in the housing. In a normal state of the device, the first connection is electrically conductively connected to the first connection region of the discharge conductor, and the second connection is connected to the second connection region by at least one component. A metal safety element, which has two contact regions and a connecting region which connects the contact regions to one another, is arranged within the housing. The first contact region is electrically conductively connected to the second connection region and the second contact region is electrically conductively connected to the component in the normal state. The connecting region is a fuse by which brief pulse currents can be transmitted by the connecting region, whereas mains-frequency short-circuit currents overload the connecting region destroying it.

22 Claims, 7 Drawing Sheets

(56) References Cited

U.S. PATENT DOCUMENTS

| | | | |
|---|---|---|---|
| 4,493,003 A * | 1/1985 | Mickelson | H01T 1/14 361/119 |
| 4,536,735 A * | 8/1985 | van der Scheer | H01H 85/055 337/158 |
| 4,738,314 A * | 4/1988 | Lee | A62C 37/12 169/19 |
| 4,930,039 A * | 5/1990 | Woodworth | H01C 7/12 361/117 |
| 6,430,020 B1 | 8/2002 | Atkins et al. | |
| 6,535,369 B1 * | 3/2003 | Redding | H01C 7/126 361/111 |
| 6,606,232 B1 * | 8/2003 | Vo | H01C 7/126 361/118 |
| 6,614,640 B2 | 9/2003 | Richter et al. | |
| 8,089,745 B2 | 1/2012 | Wosgien | |
| 8,699,197 B2 * | 4/2014 | Douglass | H01C 7/126 361/117 |
| 8,766,762 B2 | 7/2014 | Depping et al. | |
| 8,780,521 B2 * | 7/2014 | Xu | H01C 7/10 361/124 |
| 2001/0019471 A1 * | 9/2001 | Richter | H01C 7/12 361/117 |
| 2007/0139850 A1 * | 6/2007 | Kamel | H01C 7/12 361/124 |
| 2007/0285865 A1 * | 12/2007 | McLoughlin | H01H 85/0241 361/118 |
| 2009/0323244 A1 * | 12/2009 | Hoopes | H02H 9/042 361/103 |
| 2012/0050935 A1 * | 3/2012 | Douglass | H01C 7/126 361/103 |
| 2013/0335869 A1 * | 12/2013 | Xepapas | H01C 8/04 361/56 |

* cited by examiner

OVERVOLTAGE PROTECTION DEVICE

BACKGROUND OF THE INVENTION

Field of the Invention

The invention relates to an overvoltage protection device with a housing, with two terminals for electrical connection of the overvoltage protection device to the current path which is to be protected, with at least one arrester, in particular a varistor, which is located within the housing, in the normal state of the overvoltage protection device the first terminal being connected in an electrically conductive manner to the first connecting region of the arrester and the second terminal being connected to the second connecting region of the arrester via at least one component.

Description of Related Art

Electrical circuits and systems normally work without perturbations with the voltage specified for them, the rated voltage. This does not apply when overvoltages occur. Overvoltages are all voltages which are above the upper tolerance limit of the rated voltage. They include mainly also the transient overvoltages which can occur due to atmospheric discharges, but also due to switching operations or short circuits in power supply networks and can be coupled conductively, inductively or capacitively into electrical circuits. In order to protect electrical or electronic circuits wherever they are also used, against transient overvoltages, overvoltage protection devices were developed and have been used for decades.

Due to ageing and temporary overvoltages TOV in the range of seconds, an unwanted increase of the leakage current of the varistor at operating voltages occurs especially in overvoltage protection devices with a varistor as the arrester. Overvoltage protection devices with a varistor as the arrester therefore nowadays often have a thermal disconnector by which a varistor which is no longer properly operable is electrically disconnected from the current path to be monitored. In the known overvoltage protection devices, the state of the varistor is monitored according to the principle of a temperature switch, when the varistor overheats, for example, due to leakage currents which have occurred, a solder connection provided between the varistor and a disconnection means is broken; this leads to electrical disconnection of the varistor.

This overvoltage protection device is known, for example, from German Patent Application DE 695 03 743 T2. In the known overvoltage protection device which has two varistors which are located parallel to one another, the thermal disconnector is additionally connected to an optical status display so that the state of the overvoltage protection element can be read off directly on site using the optical status display. As the optical status display, this overvoltage protection device has a first slide which is located in the housing and which is actuated by separating tongues which form the isolating means, and interacts with a second slide which can be moved relative to a viewing port depending on the position of the first slide.

German Patent Application DE 601 12 410 T2 and corresponding U.S. Pat. No. 6,430,020 B1 disclose an overvoltage protection device which has a varistor disk wafer which is located in a metal housing and which is braced against the bottom of the pot-shaped housing a piston-shaped electrode. The housing is closed with a cover which is either screwed into the pot-shaped housing or is attached by a spring ring or a clip which latches in a groove in the side wall of the housing. There is an opening in the cover through which the shaft of the electrode is routed out of the housing for electrical connection of the electrode. The second terminal for electrical connection of the overvoltage protection device to the current paths or signal paths which are to be protected is made on the housing. For electrical insulation of the electrode relative to the housing, there is an insulating ring which is located within the housing and which likewise has an opening for the shaft of the electrode.

German Patent Application DE 10 2007 030 653 A1 and corresponding U.S. Pat. No. 8,089,745 B2 disclose an overvoltage protection device which, likewise, has a metal housing consisting of two housing half shells, in the housing there being preferably two varistors which are connected in parallel to one another and one central electrode which is located between the varistors. The two varistors can be forced away from the central electrode by a thermal disconnector which is located in the housing, as a result of which the varistors are disconnected from the current path.

The above described thermal disconnectors which are often used in the known overvoltage protection devices and which are based on the melting of a solder connection have the disadvantage that they have a relatively inert response behavior; this can lead to the fact that rapidly rising fault currents, which due to damage to the overvoltage protection device flow via the latter, do not lead promptly enough to breaking the solder connection. If the impedance of a faulty arrester has changed so dramatically that high line-driven fault currents flow via the arrester, the high power transfer resulting therefrom within the overvoltage protection device which has become low-resistance heat the latter so quickly and so dramatically that open arcs can occur before the thermal disconnector has disconnected the overvoltage protection device.

To prevent these fault cases, in practice, separate back-up fuses, for example, fusible links, are used as short-circuit current protection; they must be matched to the discharge capacity of the overvoltage protection device. But, it is disadvantageous here that, on the one hand, an additional component is needed with the back-up fuse, that on the other hand these promptly reacting back-up fuses have only a limited impulse current-carrying capacity.

German Patent Application DE 10 2010 015 814 A1 and corresponding U.S. Pat. No. 8,766,762 B2 disclose an overvoltage protection device of the type initially described in which, in a two-part housing, there are two varistors which are connected in parallel to one another and a gas-filled surge arrester which is connected in series to the varistor as a component. In addition, in one preferred version of the known overvoltage protection device, a respective fusible link is assigned to the two varistors as a back-up fuse. By integrating the fusible link into the housing of the overvoltage protection device, the use of additional separate back-up fuses can be eliminated. However, the disadvantage here is also that the fusible links are only conditionally power pulse current-proof according to the characteristic fusing integral.

As was already stated at the beginning, due to ageing and frequent pulsed loading, in varistors at the end of their lives the insulating properties are diminished, as a result of which a power loss is converted in the varistor; this leads to heating of the varistor. The temperature of a varistor can rise so dramatically that there is a risk of fire. In order to prevent such dramatic heating, in the known overvoltage protection device, in addition there is still at least one temperature-dependent, short-circuit switch, the short-circuit switch or switches however short circuiting the varistor or varistors. Altogether, the known overvoltage protection device thus has a host of components, to achieve the described advantages in particular two varistors which are connected in parallel being necessary.

SUMMARY OF THE INVENTION

Therefore, the object of this invention is to provide an overvoltage protection device of the type initially described which is made especially durable and long-lived and which is also to be built and mountable as simply and economically as possible.

This object is achieved in the initially described overvoltage protection device in that there is a fusible element of metallic material within the housing, the fusible element having two contact regions and a connecting region which connects the contact regions to one another. The first contact region of the fusible element is connected in an electrically conductive manner to the second connecting region of the arrester and the second contact region of the fusible element in the normal state of the overvoltage protection device is connected in an electrically conductive manner to the component. In the normal state, an electrically conductive connection between the first arrester and the component thus takes place via the fusible element.

In order to be able to reliably interrupt a short-circuit current which is flowing via the overvoltage protection device in case of a fault within the housing of the overvoltage protection device, in the overvoltage protection device in accordance with the invention, the connecting region of the fusible element is formed by a controlled material reduction as a fusible link. The material reduction takes place such that short pulsed currents which result from overvoltages which are to be discharged from the overvoltage protection device can be transmitted via the connecting region. Conversely, line-frequency short circuit currents which in a fault case flow via the overvoltage protection device and thus also via the connecting region lead to an overload of the connecting region so that the connecting region melts and is thus destroyed.

According to one advantageous configuration of the overvoltage protection device in accordance with the invention, the fusible element is made cylindrical, the two contact regions extending essentially perpendicular to the connecting region. The above described material reduction of the connecting region is preferably implemented by the connecting region having a lattice structure, the individual lattice braces of the connecting region being used as current paths and to ensure the desired function as a fusible link having a correspondingly small cross section. The formation of the connecting region with a lattice structure makes to possible to match the cross section of the individual lattice braces to the respective demands of the monitored and protected current path by corresponding dimensioning of the cross section.

Because the fusible element is made cylindrical, it has very low inductance, as a result of which a low protection level for the overvoltage protection device can be achieved. The cylindrical execution of the fusible element moreover also has the advantage that by a pulsed current or short circuit current which is to be discharged no resulting dynamic current forces occur which damage or adversely affect the mechanical construction of the fusible element and of the overvoltage protection device overall.

According to one configuration of the overvoltage protection device in accordance with the invention, the component is a metal body via which in the normal state of the overvoltage protection device the second terminal is connected in an electrically conductive manner to the second contact region of the fusible element. The metal body is preferably made as an essentially cylindrical hollow body.

According to one preferred configuration of the overvoltage protection device in accordance with the invention, the component is a second arrester, especially a gas-filled surge arrester which is connected in series to the first arrester. In the normal state of the overvoltage protection device the first connecting region of the second arrester is connected in an electrically conductive manner to the second terminal and the second connecting region of the second arrester is connected in an electrically conductive manner to the second contact region of the fusible element. Thus, in the normal state of the overvoltage protection device, between the two terminals of the overvoltage protection device, there is a series connection of the two arresters and the fusible element which is located in between.

The above described execution of the connecting region as well as the arrangement and configuration of the fusible element make available an overvoltage protection device which is suitable for high rated voltages up to 1000 V or more and is thus made free of line follow currents.

So that the overvoltage protection device in accordance with the invention can also be used for high rated voltages, as the first arrester, it preferably has a high-power varistor in wafer form. The second arrester can preferably be formed by a gas-filled surge arrester. The arrangement of the second arrester between one terminal of the overvoltage protection device and the varistor as a first arrester has the advantage that, first of all, the characteristic ignition voltage of the second arrester must be exceeded before there is an overvoltage on the varistor. In this way, the varistor is only loaded at the relevant overvoltages which endanger the system or the current path to be protected, while smaller voltage peaks which are below the ignition voltage of the second arrester do not lead to loading of the varistor. This leads to slower ageing and damage of the varistor; this benefits the service life of the overvoltage protection device. The first arrester which is made as a varistor is used to extinguish line follow current after the gas-filled surge arrester has ignited.

In this specification, below, it is always assumed that the component is a second arrester, without the invention being limited thereto, i.e., fundamentally, a metal body can also be used as the component.

Fundamentally, the first arrester and its second connecting region can make contact with the fusible element and its first contact region. But preferably, there is an especially wafer-shaped first contact element whose first contact surface is in electrically conductive contact with the second connecting region of the first arrester and its second contact surface is in electrically conductive contact with the first contact region of the fusible element. The plate-shaped contact element which makes contact with the second arrester preferably in a blanket manner is thus located between the first arrester and the fusible element.

The second arrester or the component is also preferably connected in an electrically conductive manner to the fusible element via one contact element. The contact element is thus in electrically conductive contact with the second connecting region of the second arrester and of the component and also with the second contact region of the fusible element. If the component is a metal body, the contact element can preferably be made integrally with the metallic body.

Basically, the first arrester with its second connecting region could be permanently connected, for example, by means of soldering or welding, to the first contact region of the fusible element or to the corresponding contact surface of one contact element. In order to be able to compensate for possible thickness tolerances of the arrester used, contact is made with the first arrester however preferably by means of a spring element which is located in the housing. To do this, the first contact region of the fusible element is pressed against the second connecting region of the first arrester by the spring force of the spring element. If there is a contact element between the first arrester and the fusible element, the first contact region of the fusible element is pressed by the spring element against the second contact surface of the contact element which rests on the first arrester.

In order to prevent a short circuit of the first arrester via the metallic housing when using a plate-shaped contact element which makes contact with the first arrester, there is an insulating element on which the contact element rests. The insulating element is preferably formed of a very elastic material, for example, of foamed polyurethane or silicone foam, so that the insulating element acts at the same time as a seal. The insulating element then seals the chamber which has been formed between the housing and the contact element for the first arrester against atmospheric effects, for example, against atmospheric humidity.

In particular, when a varistor is used as the first arrester, the overvoltage protection device preferably has another mechanical disconnector which is activated in the case of a thermal overload. The mechanical disconnector has a solder site and a spring element, the solder site being arranged such that the first connecting region of the second arrester is held against the spring force of the spring element acting on it in one contact position with the second terminal as long as the solder site does not melt. If the solder site is heated to its melting point, this leads to a softening of the solder site so that the solder site can no longer apply the required opposing force to the spring force of the spring element, this leads to the second arrester being forced away from the second terminal by the spring element, i.e., the electrically conductive contact between the second terminal and the second arrester is broken.

According to one advantageous configuration, the solder site is arranged such that it is connected in a thermally conductive manner to the first arrester and also to the second arrester so that both undue heating of the first arrester and also undue heating of the second arrester leads to a corresponding heating of the solder site to its melting point. Preferably, the solder site is formed between the second contact region of the fusible element and the second arrester or the contact element which is assigned to the second arrester.

In practice, for special applications, for example, in wind power plants or railroad systems, not only are especially durable, efficient overvoltage protection devices necessary, they should also be able to be integrated into the busbar system without using additional connecting lines. This direct integration into the busbar system leads to the fact that an additional back-up fuse cannot be installed for the overvoltage protection device. This problem is solved in the overvoltage protection device in accordance with the invention by the arrangement and execution of the fusible element which was described separately above.

So that the overvoltage protection device can be integrated as easily as possible directly into the busbar system, according to a preferred configuration of the overvoltage protection device in accordance with the invention, the first terminal of the overvoltage protection device is formed by the fastening sections which are made on the housing and via which the housing can be connected to the support plate as a busbar. The fastening sections are preferably made as fastening flanges which are located uniformly distributed on the bottom of the housing, the fastening sections projecting radially above the housing and also beyond the bottom of the housing. In this way, the housing can be easily mounted on the support plate by means of screws, blanket contact of the bottom of the housing with the support plate being avoided so that heat is hardly discharged from the housing into the support plate.

The housing is preferably made in two parts, the first housing part being made pot-shaped and having a cavity which accommodates the arresters. For electrical connection of the first arrester to the fastening sections of the housing, it is sufficient if the first arrester rests with its first connecting region on the housing bottom. The second housing part is made preferably as a housing cover which is insulated relative to the first housing part and is connected to the second terminal of the overvoltage protection device. The second terminal can have a terminal stud on which a second busbar can be easily connected by means of a screw. The housing cover with the integrated terminal stud is preferably produced by the terminal stud being directly spray-coated with plastic in the production process of the housing cover.

According to a last advantageous configuration of the invention, which will be briefly explained here, the overvoltage protection device has an optical status display, and preferably in addition, also a remote indication apparatus for remote indication of the state of the overvoltage protection device. The optical status display and the remote indication apparatus are preferably located on the housing cover or are integrated in the housing cover.

According to one preferred configuration of the optical status display, it has a fixed first part and a movable second part, the second part being moved by the spring force of a spring element out of a first position into a second position if, in the case of thermal overload, the electrical connection between the first terminal and the second arrester or the metal body is broken. The spring element is preferably the spring element of the mechanical disconnector so that an additional spring element for actuating the optical status display is not necessary. In order to be able to recognize a position change of the second movable part of the optical status display, there is a corresponding viewing port in the housing. In the first position of the second part of the optical status display in which the arrester is not disconnected, i.e., in the normal state of the overvoltage protection device, the second part is located underneath the viewing port. Conversely, in the case of a thermal overload the movable second part of the optical status display has been pressed into the interior of the housing to the extent that the first part of the optical status display can be recognized through the viewing port. Thus, the state of the overvoltage protection device can be easily recognized from the outside by the corresponding coloring of the first part red and of the second part green of the status display.

According to one preferred configuration of the remote indication apparatus, it has a remote indication switch and a movable, spring-loaded plunger, the plunger activating the remote indication switch if, in the case of a thermal overload, the electrical connection between the second terminal and the second arrester is broken. Preferably, one end of the plunger is in contact with the movable second part of the optical status display, so that movement of the second part of the optical status display out of its first position into its second position also causes a displacement of the piston, and thus, activation of the remote indication contact.

In particular, there is now a host of possibilities for embodying and developing the overvoltage protection device in accordance with the invention as will be apparent from the following description of preferred exemplary embodiments in conjunction with the drawings.

DETAILED DESCRIPTION OF THE INVENTION

Figure 1:
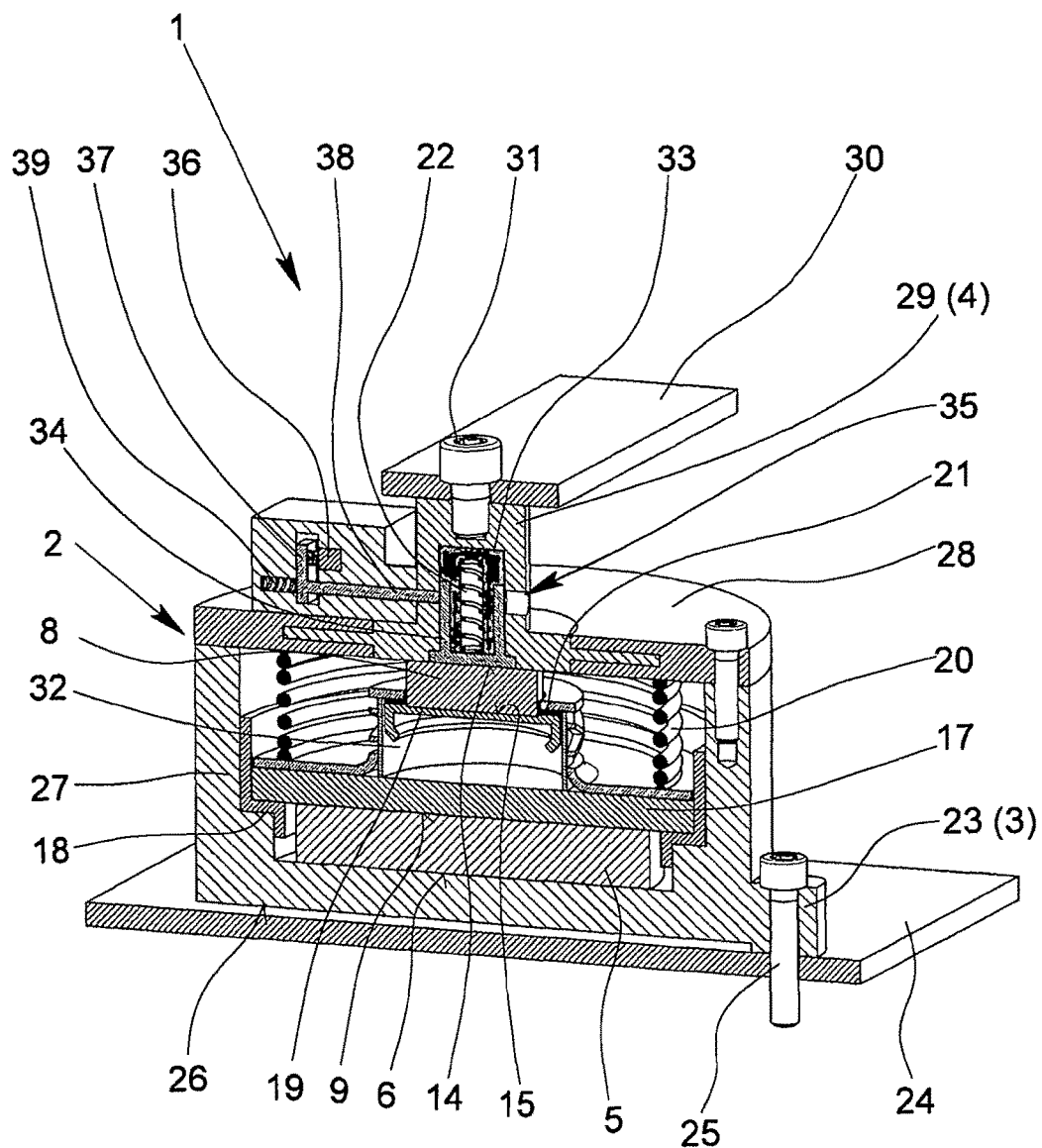
FIG. 1 is a cutaway perspective view of a preferred exemplary embodiment of an overvoltage protection device in accordance with the invention with the disconnector not triggered.
Figure 2:
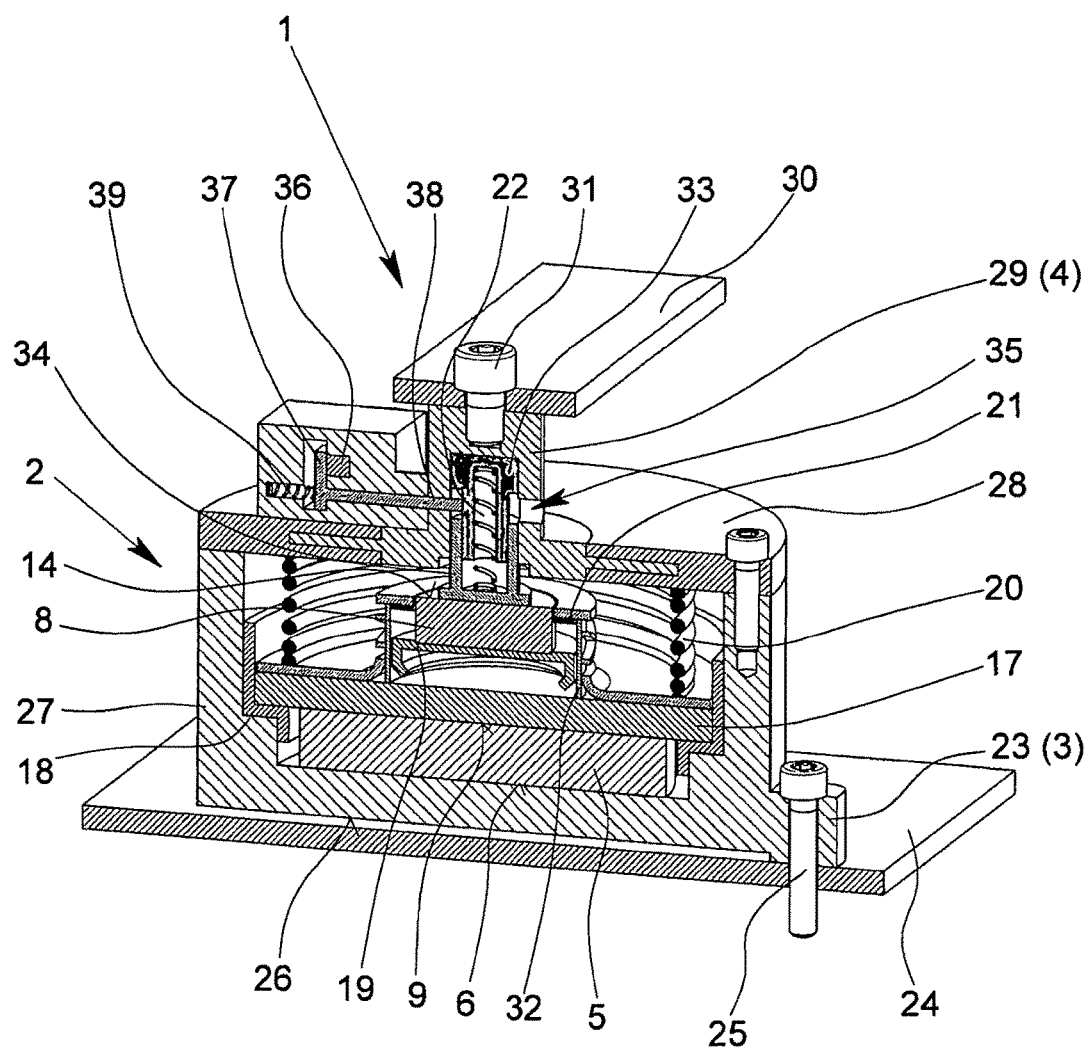
FIG. 2 is a perspective of the overvoltage protection device according to FIG. 1, with the disconnector triggered.

FIGS. 1 to 4 show a first preferred embodiment of the overvoltage protection device 1 in accordance with the invention with an essentially cylindrical housing 2 formed of metal, especially of aluminum, and with two terminals 3, 4 on the housing 2 for electrical connection of the overvoltage protection device 1 to the current path which is to be protected. Within the housing 2, there is a wafer-shaped varistor 5 as a first arrester. Moreover, between the two terminals 3, 4, in series with the varistor 5, there is a component in the housing 2 which is a gas-filled surge arrester 8 the exemplary embodiment according to FIGS. 1 to 4 and is a metal body 7 in the second exemplary embodiment according to FIGS. 6 and 7.

Figure 3:
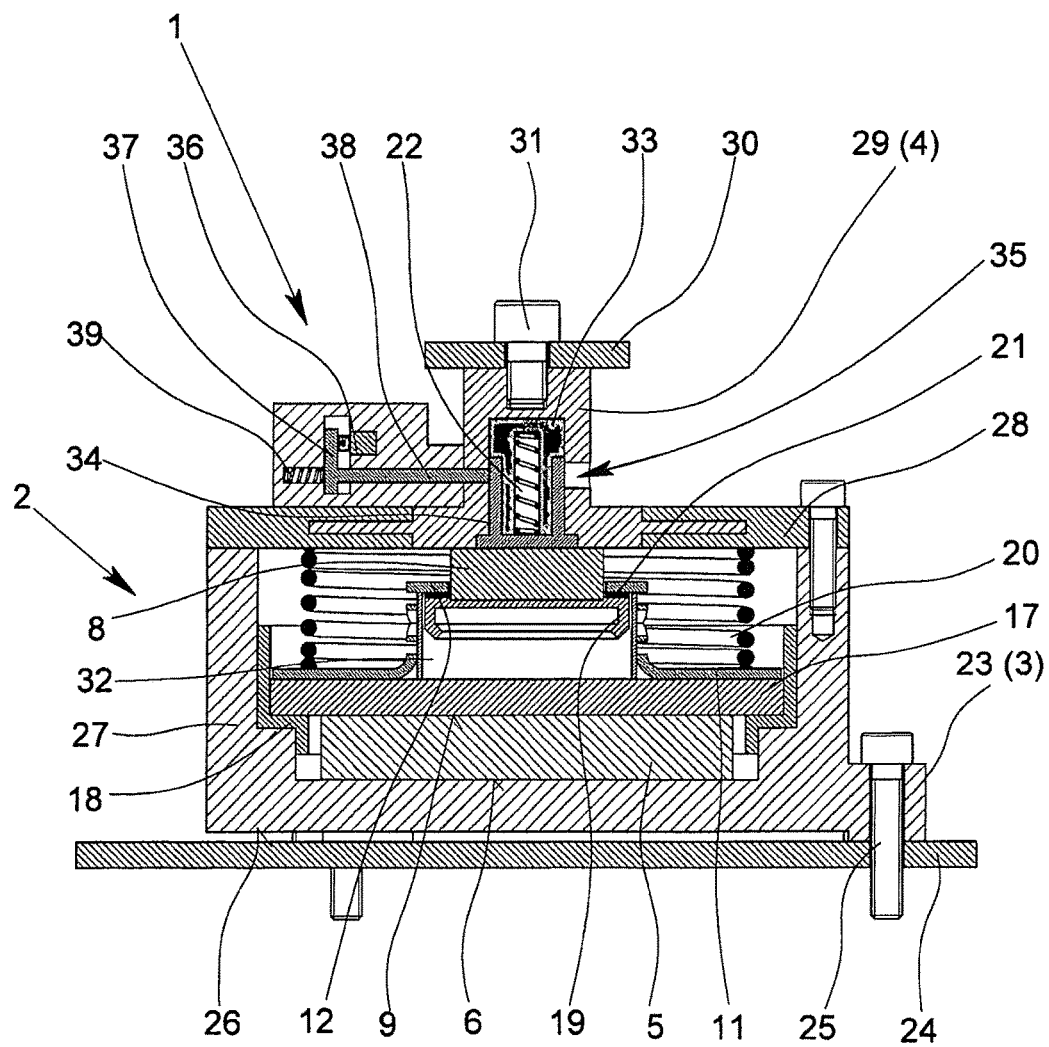
FIG. 3 is a sectional view of the overvoltage protection device according to FIG. 1, with the disconnector not triggered.
Figure 4:
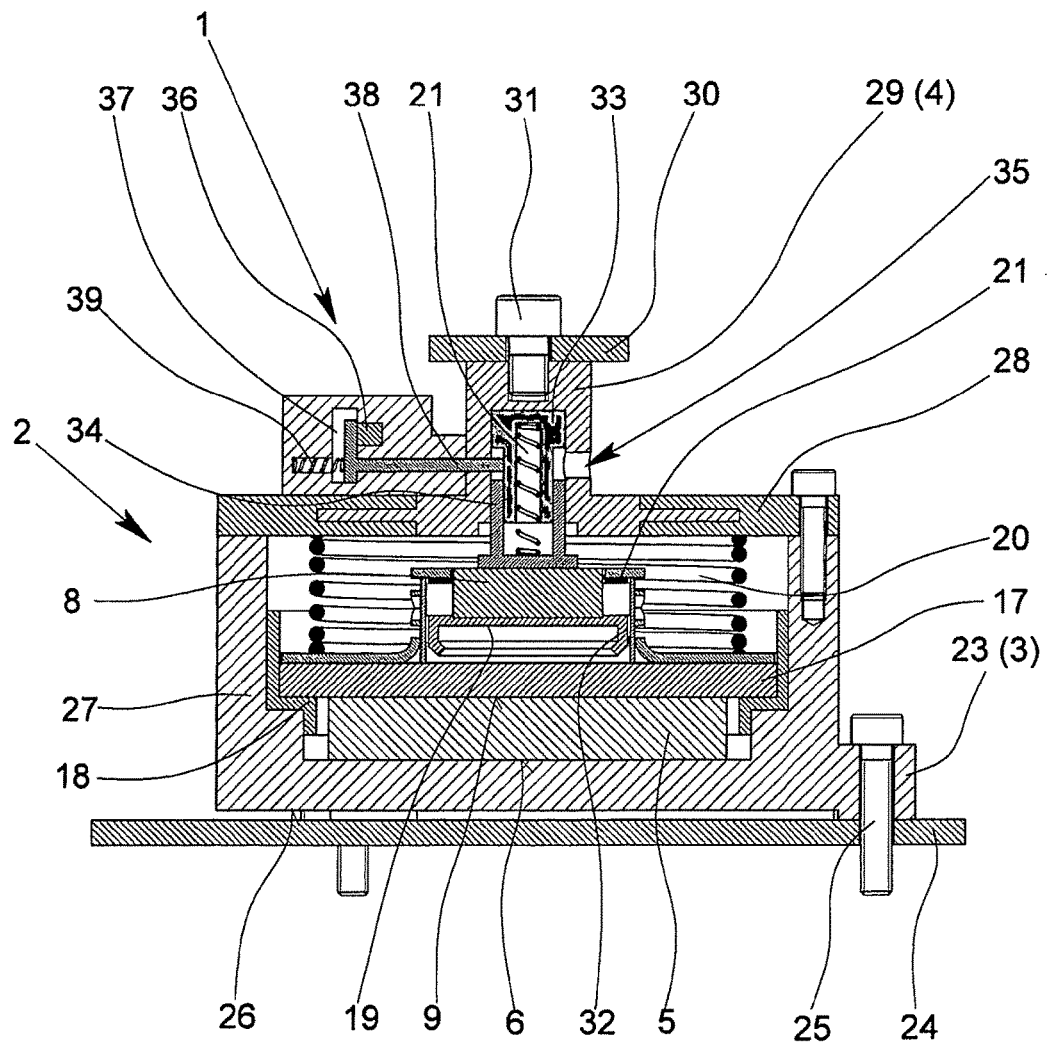
FIG. 4 is a sectional view of the overvoltage protection device according to FIG. 3, with the disconnector triggered.

In the normal state of the overvoltage protection device 1 which is shown in FIGS. 1 and 3, the first terminal 3 is connected in an electrically conductive manner to the first connecting region 6 of the varistor 5 and the second terminal 4 is connected in an electrically conductive manner to the second connecting region 9 of the varistor 5 via the gas-filled surge arrester 8. Accordingly, in the second exemplary embodiment according to FIG. 6, the first terminal 3 is connected in an electrically conductive manner to the first connecting region 6 of the first varistor 5 and the second terminal 4 is connected in an electrically conductive manner to the second connecting region 9 of the varistor 5 via the metal body 7.

The arrangement of the gas-filled surge arrester 8 as an additional arrester, i.e., is in addition to the varistor 5 which is provided as the "actual" arrester for overvoltages, first of all, has the advantage that the characteristic ignition voltage of the gas-filled surge arrester 8 must be exceeded before there is an overvoltage on the varistor 5. This leads to the varistor 5 being loaded only at relevant overvoltages which endanger the system which is to be protected or the current path which is to be protected. Smaller voltage peaks which are below the ignition voltage of the gas-filled surge arrester 8 do not lead to loading of the varistor 5 which leads to slower ageing and damage of the varistor 5.

Figure 5:
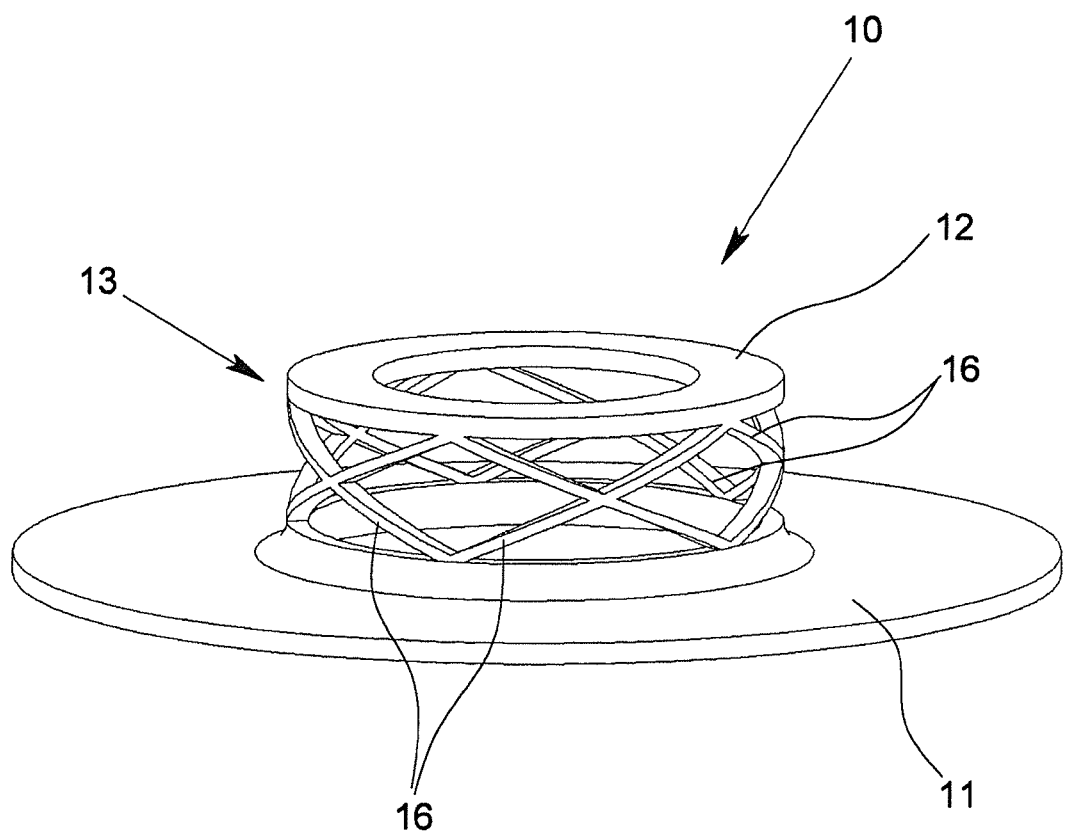
FIG. 5 is an enlarged perspective view of the fusible element which is located in the overvoltage protection device.

The electrical connection between the first arrester 5 and the second arrester 8 takes place in the overvoltage protection device 1 in accordance with the invention by a specially made fusible element 10 which is shown in FIG. 5 in detail. The fusible element 10, which is formed of a metallic material that does not have especially high conductivity, has two contact regions 11, 12 and a connecting region 13 which connects the contact regions 11, 12 to one another. The first contact region 11 of the fusible element 10 is connected in an electrically conductive manner to the second connecting region 9 of the varistor 5. Moreover, in the normal state of the overvoltage protection device 1, as is apparent from FIGS. 1 and 3, the second terminal 4 is connected in an electrically conductive manner to the first connecting region 14 of the gas-filled surge arrester 6 and the second connecting region 15 of the gas-filled surge arrester 6 is connected in an electrically conductive manner to the second contact region 12 of the fusible element 10.

FIG. 5 shows that the fusible element 10 is made roughly cylindrical, the two contact surfaces 11, 12 extending essentially perpendicular to the connecting region 13. The connecting region 13 has a lattice structure, the individual lattice braces 16 of the connecting region 13 being used as current paths for a current which is flowing via the overvoltage protection device 1. Because the connecting region 13 has a lattice structure, the individual lattice braces 16 having only a small cross section, the material of the connecting region 13 which is available for current transmission is greatly reduced so that the connecting region 13 acts as a fusible link.

The arrangement of the lattice braces 16 and of their cross section are chosen such that short pulsed currents or peak currents which result from overvoltages which are to be discharged from the overvoltage protection device 1 can be transmitted via the connecting region 13, and thus, also the via fusible element 10. But, if due to damage to the overvoltage protection device 1, in particular to the varistor 5 or to the gas-filled surge arrester 8, a line-frequency short circuit current flows via the fusible element 10, this leads to the lattice braces 16 which are used as current paths being overloaded by the flowing short-circuit current, and therefore, melting within a short time so that the electrical connection, and thus, also the short circuit current are interrupted. Possible arcs can be extinguished by suitable arc extinguishing media located within the housing 2, for example, by sand, as a result of which the desired interruption of the short circuit current is supported.

As is apparent from FIGS. 1 and 3, the fusible element 10 and its contact regions 11, 12 are not directly connected to the two arresters 5, 8. A wafer-shaped contact element 17 is located on the second connecting region 9 of the varistor 5 and rests in its edge region on an insulating element 18, as a result of which the contact element 17 is insulated from the housing 2, in order to avoid a short circuit of the varistor 5. The annularly made insulating element 18 is formed of a very elastic material, especially a foamed material, for example, polystyrene foam or silicone foam, so that the insulating element 18 also acts as a seal. Thus, the insulating element 18 seals the varistor chamber which is formed by the housing 2 and the contact element 17 against atmospheric effects, for example, atmospheric humidity. For contact-making of the gas-filled surge arrester 8, there is a contact element 19 which is permanently connected, in particular soldered or welded, to the second connecting region 15 of the gas-filled surge arrester 8. In the normal state of the overvoltage protection device 1, thus, the contact element 17 which is assigned to the varistor 5 is connected in an electrically conductive manner to the contact element 19 which is assigned to the surge arrester 8 via the fusible element 10.

To ensure an electrical transition as good as possible between the varistor 5 and the contact element 17 as well as the contact element 17 and the fusible element 10, there is a spring element 20 by which the first contact region 11 of the fusible element 10 is pressed against the contact surface of the contact element 17 which is opposite the contact region 11, and thus, also the contact element 17 is pressed against the varistor 5. To achieve a contact surface which is as large as possible, the turn of the spring element 20 which rests on the contact region 11 is flattened. Possible thickness tolerances of the varistor 5 used can be equalized in the illustrated structure of the overvoltage protection device 1 within certain limits by the elasticity of the insulating element 18 and by the spring element 20, without the spring force with which the contact region 11 of the fusible element 10 is pressed against the contact element 17 changing noticeably.

In addition to the interruption of an unwanted short circuit current which is accomplished by the fusible element 10 via the overvoltage protection device 1, in the overvoltage protection device 1, there is a mechanical disconnector which triggers in the case of a thermal overload and interrupts a flow of current through the overvoltage protection device 1. The mechanical disconnector has a solder site 21 as a thermally sensitive element and a spring element 22, the gas-filled surge arrester 8 being exposed by the spring element 22 to a spring force which is directed away from the second terminal 4. In spite of the spring force of the spring element 22, the first connecting region 14 of the gas-filled surge arrester 8 remains in the contact position with the second terminal 4 as long as the solder site 21 is not heated above its melting point.

As is apparent from FIGS. 1 and 3, the solder site 21 is formed between the second contact region 12 of the fusible element 10 and the contact element 19 which is attached to the gas-filled surge arrester 8. In this way the solder site 21 is connected by thermal conduction via the fusible element 10 and the contact element 17 both to the varistor 5 and also via the contact element 19 to the gas-filled surge arrester 8. Undue heating both of the varistor 5 and also of the gas-filled surge arrester 8 thus leads to a heating of the solder site 21 so that the solder site 21 melts when its melting point is reached and thus can no longer apply the opposing force to the spring force of the spring element 22. As is apparent in FIGS. 2 and 4, this then leads to the gas-filled surge arrester 8 being pressed by the spring force of the spring element 22 into the housing interior so that the first connecting region 14 of the gas-filled surge arrester 8 no longer makes contact with the second terminal 4 of the overvoltage protection device 1. The current path between the two terminals 3, 4 is interrupted in this way.

Figure 6:
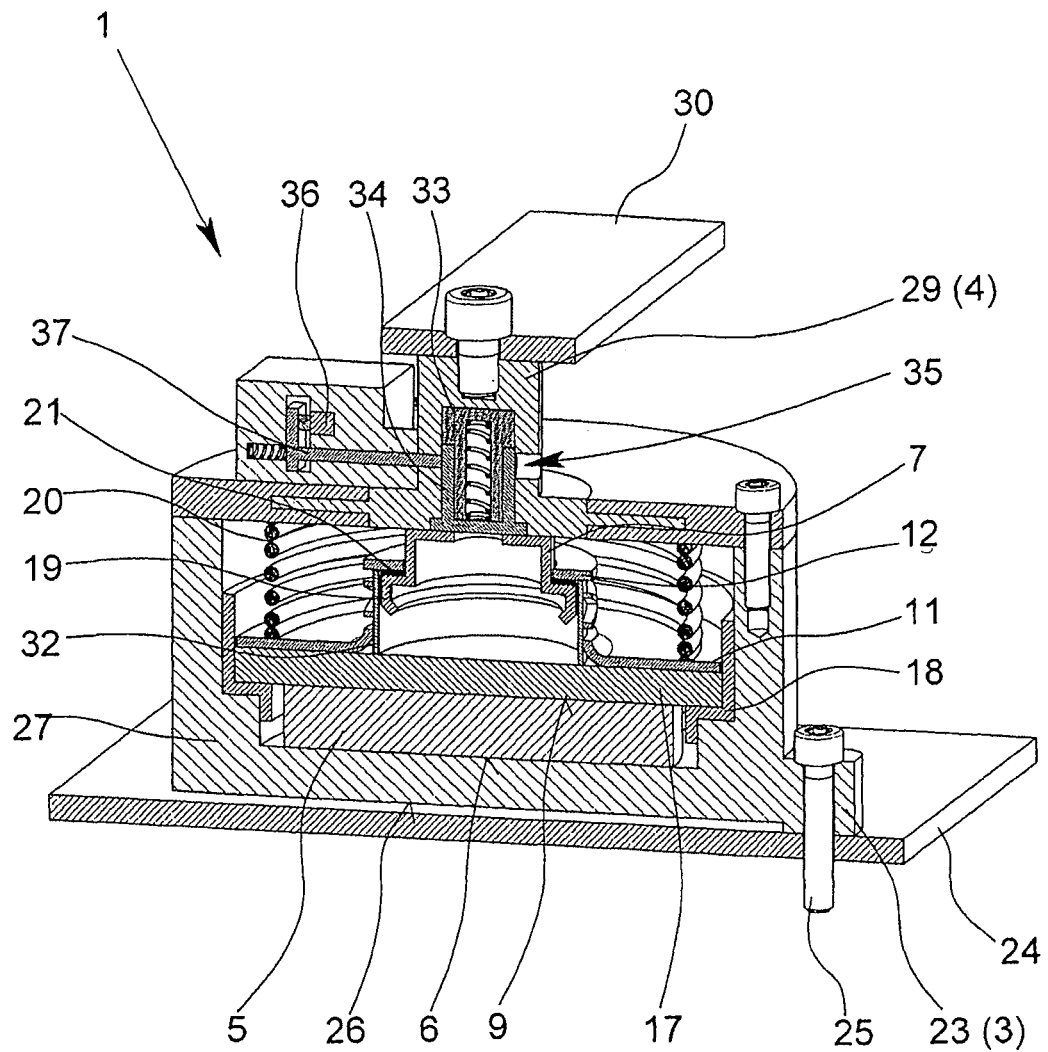
FIG. 6 is a sectional perspective view of a second exemplary embodiment of an overvoltage protection device in accordance with the invention, with the disconnector not triggered.
Figure 7:
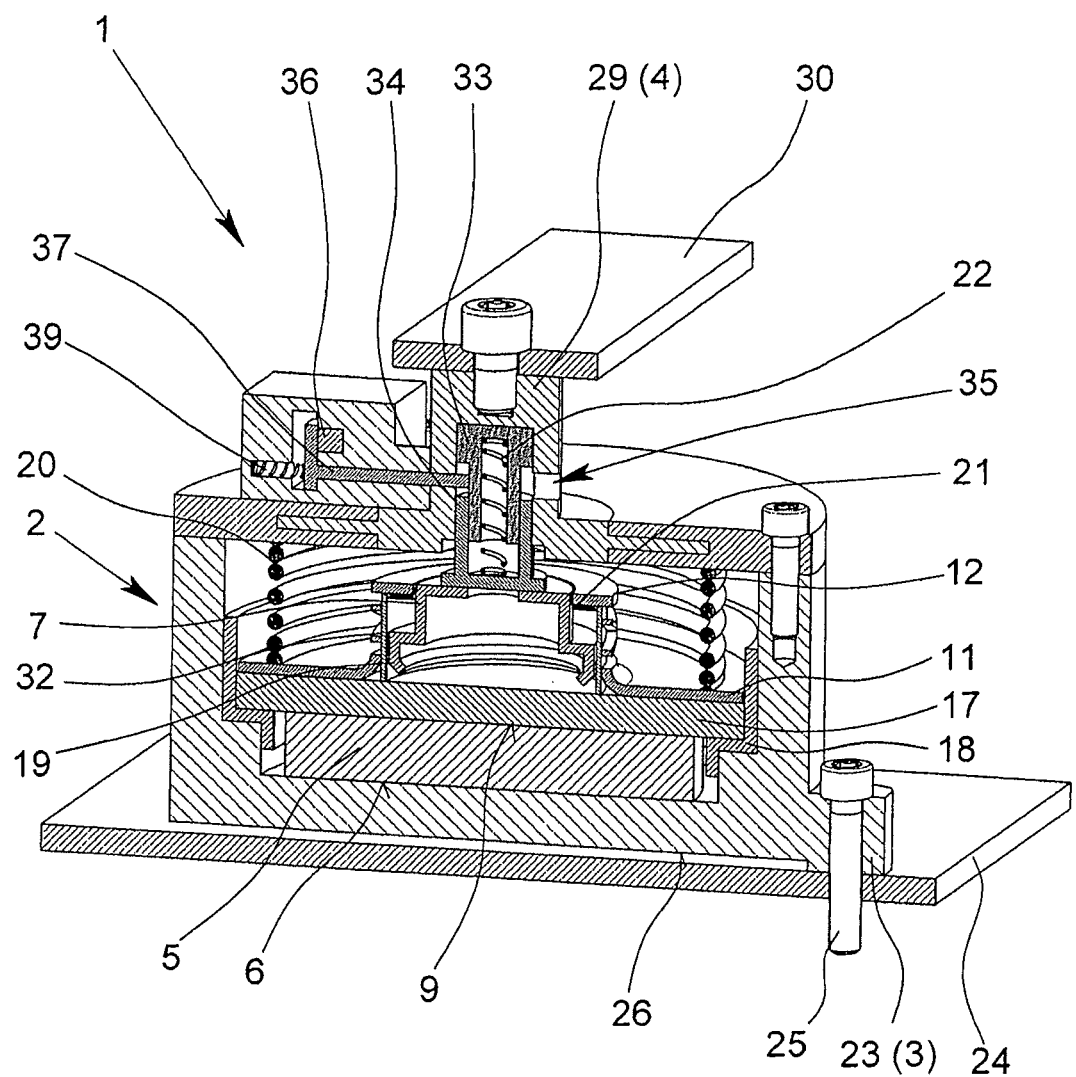
FIG. 7 is a sectional perspective view of the overvoltage protection device according to FIG. 6, with the disconnector triggered.

In the exemplary embodiment of the overvoltage protection device 1 according to FIGS. 6 and 7, instead of the second arrester there is a metal body 7 within the housing 2. In the normal state of the overvoltage protection device 1, the second terminal 4 is connected in an electrically conductive manner to the second contact region 12 of the fusible element 10 via the metal body 7. The metal body 7 is made as a cylindrical hollow body, on the side facing away from the second terminal 4 a contact element 19 or a contact section being formed which is made in one piece with the metal body 7.

In the normal state of the overvoltage protection device 1, the contact element 19 is in electrically conductive contact with the second contact region 12 of the fusible element 10 via the solder site 21. If the solder site 21 is heated so that the solder site 21 melts and thus can no longer apply the force opposing the spring force of the spring element 22, in the exemplary embodiment as shown in FIGS. 6 and 7, this leads to the metal body 7 being pressed by the spring force of the spring element 22 into the housing interior so that the metal body 7 no longer makes contact with the second terminal 4 of the overvoltage protection device 1 compare FIG. 7. The current path between the two terminals 3, 4 is then likewise interrupted.

In the overvoltage protection device 1 in accordance with the invention which is shown in the figures, the housing 2 is made very durable; this is achieved in particular by the housing 2 being made cylindrical and of metal. Moreover, the overvoltage protection device 1 can be very easily integrated into the current path which is to be monitored, in particular without additional connecting lines, due to the execution of the housing 2.

As is apparent from the figures, the arrester 5 rests in a blanket manner with its first connecting region 6 on the bottom of the housing. For electrical connection of the arrester 5, the housing 2 has three fastening sections 23 which form the first terminal 3 of the overvoltage protection device 1 and via which the housing 2 can be connected to the support plate 24 as a busbar. The fastening sections 23 which are made as flanges are located at an angle of 120° relative to one another and each have a hole so that the housing 2 can be mounted with corresponding fastening screws 25 on the support plate 24. Since the fastening sections 23 project beyond the bottom 26 of the housing 2, there is no blanket contact between the bottom 26 of the housing and the support plate 24 so that heat is hardly discharged from the housing 2 into the support plate 24.

In the illustrated overvoltage protection device 1, the housing 2 is made in two parts, the first housing part 27 being made pot-shaped, in particular the varistor 5 and the metal body 7 or the gas-filled surge arrester 8 as well as the fusible element 10 and the contact elements 17, 19 being located in the cavity of the housing part 27. The second housing part is made as a housing cover 28 which is insulated relative to the first housing part 27. The housing cover 28 has a terminal stud 29 as the second terminal 4 of the overvoltage protection device 1, and the terminal stud 29 can be directly spray-coated with plastic in the production process so that subsequent mounting of the terminal stud 29 on the housing cover 28 is eliminated. By the execution of the terminal stud 29, a second busbar 30 can be easily attached to the housing 2 by means of a screw 31 so that the overvoltage protection device 1 can be connected without additional connecting lines to the busbars 24, 30, and thus, can be integrated into a busbar system which is to be monitored.

In order to prevent mechanical damage of the connecting region 13 of the fusible element 10 by the spring force of the spring element 22 which is acting on the gas-filled surge arrester 8 in an existing solder connection, there is an elastic support element 32 within the fusible element 10. The support element 32 is therefore surrounded by the connecting region 13 and is supported, on the one hand, on the second contact region 12 of the fusible element 10, and on the other hand, on the second contact surface of the contact element 17. The support element 32 prevents the transfer of the spring force of the spring 22 via the solder site 21 to the second contact region 12 of the fusible element 10. A desired spring action of the support element 32 can be achieved by a corresponding material choice or for example, by a honeycomb structure of the support element 32, the support element 32 having to be made stiffer than the connecting region 13 of the fusible element 10.

Finally, the housing 2 of the overvoltage protection device 1 has another optical status display which is formed of a permanently arranged first part 33 and a movably arranged second part 34. Moreover, the housing cover 28 has a viewing port 35 by which, depending on the state of the overvoltage protection device 1, either the first red part 33 or the second green part 34 of the optical status display is visible. To move the second part 34 out of its first position FIGS. 1, 3 and 6 into its second position FIGS. 2, 4 and 7 the spring force of the spring element 22 is used.

As is apparent from a comparison of FIGS. 1 and 2, FIGS. 3 and 4 or FIGS. 6 and 7, if as a result of undue heating the temperature of the solder site 21 has reached its melting point, and thus, the gas-filled surge arrester 8 is pressed by the spring element 22 into the interior of the housing 2, the second part 34 of the optical status display is located in its second lower position so that the first part 33 of the optical status display can be recognized through the viewing port 35. In the normal state of the overvoltage protection device 1, conversely, the second part 34 is located underneath the viewing port 35. By a corresponding color choice—first part 33 red and second part 34 green—it can thus be easily recognized through the viewing port 35 whether the mechanical disconnector has triggered or not.

In addition to the above described optical status display, the overvoltage protection device 1 also has a remote indication apparatus for remote indication of the state of the overvoltage protection device 1. The remote indication apparatus is located altogether on the housing cover 28 and has a remote indication switch 36, a movably arranged plunger 37 and a spring 39 which applies a spring force to the plunger 37. In the normal state of the overvoltage protection device 1 FIGS. 1, 3 and 6, the remote indication switch 36 is not actuated since the actuating section of the plunger 37 is spaced a short distance from the remote indication switch 36 and to its actuator. Here, the plunger 37 is held against the spring force of the spring 39 in this first position by the end 38 of the plunger 37 being supported on the second part 34 of the optical status display. Conversely, if the second movably arranged part 34 of the optical status display has been moved down into its second position, the plunger 37 is also moved by the spring 39 into its second position in which the plunger 37 actuates the remote indication switch 36. The spring-loaded plunger 37 thus detects the position of the movable second part 34 of the optical status display, so that a change of the optical status display which has taken place due to the triggering of the thermally activated mechanical disconnector can be displayed via the remote indication apparatus also at a remote location, for example, a control room.

What is claimed is:

1. An overvoltage protection device, comprising:
   a housing,
   first and second terminals for electrical connection of the overvoltage protection device to a current path which is to be protected,
   at least one arrester which is located within the housing and having first and second connecting regions, the first terminal being connected in an electrically conductive manner to the first connecting region of the arrester and the second terminal being connected to the second connecting region of the arrester via at least one component, and
   a fusible element of metallic material within the housing, the fusible element having first and second contact regions and a connecting region which connects the contact regions to one another,
   wherein the first contact region of the fusible element is connected in an electrically conductive manner to the second connecting region of the arrester and the second contact region of the fusible element, in the normal state of the overvoltage protection device, is connected in an electrically conductive manner to the component,
   wherein the connecting region is formed as a fusible link by material reduction such that short pulsed currents which result from overvoltages which are to be discharged from the overvoltage protection device are able to be transmitted via the connecting region, while in case of a fault line-frequency short circuit currents flowing via the overvoltage protection device, the connecting region is constructed so as to overload and be destroyed, and
   wherein the fusible element is cylindrical, wherein the contact regions extend essentially perpendicular to the connecting region, and wherein the connecting region has a lattice structure with individual lattice braces of the lattice structure forming current paths having a small cross section.

2. The overvoltage protection device as claimed in claim 1, wherein the component is a metal body via which, in the normal state of the overvoltage protection device, the second terminal is connected in an electrically conductive manner to the second contact region of the fusible element.

3. The overvoltage protection device as claimed in claim 1, wherein the component is a second arrester which is connected in series to the first arrester, wherein, in the normal state of the overvoltage protection device, the first connecting region of the second arrester is connected in an electrically conductive manner to the second terminal and the second connecting region of the second arrester is connected in an electrically conductive manner to the second contact region of the fusible element.

4. The overvoltage protection device as claimed in claim 3, wherein the second arrestor is a gas-filled surge arrester.

5. The overvoltage protection device as claimed claim 1, wherein the fusible element is formed of a material with a low conductivity.

6. The overvoltage protection device as claimed in claim 1, wherein the material with a low conductivity is a high-grade steel.

7. The overvoltage protection device as claimed in claim 1, further comprising a contact element having a first contact surface in electrically conductive contact with the second connecting region of the first arrester, and a second contact surface in electrically conductive contact with the first contact region of the fusible element.

8. The overvoltage protection device as claimed in claim 7, further comprising an insulating element within the housing on which the contact element rests so that the contact element is insulated from the housing, and wherein the insulating element is formed of an elastic material that enables the insulating element to also act as a seal.

9. The overvoltage protection device as claimed in claim 1, further comprising a contact element which is in electrically conductive contact with both the component and also with the second contact region of the fusible element.

10. The overvoltage protection device as claimed in claim 1, further comprising a first contact element having a first contact surface in electrically conductive contact with the second connecting region of the first arrester, and a second contact surface in electrically conductive contact with the first contact region of the fusible element, and a second contact element which is in electrically conductive contact with both the component and also with the second contact region of the fusible element, wherein the fusible element, in the normal state of the overvoltage protection device, connects the first contact element to the second contact element in an electrically conductive manner.

11. The overvoltage protection device as claimed in claim 7, further comprising a spring element that is located within the housing at a position causing the first contact region of the fusible element to be pressed against one of the second connecting region of the first arrester and the second contact surface of the contact element.

12. An overvoltage protection device, comprising:
a housing,
first and second terminals for electrical connection of the overvoltage protection device to a current path which is to be protected,
at least one arrester which is located within the housing and having first and second connecting regions, the first terminal being connected in an electrically conductive manner to the first connecting region of the arrester and the second terminal being connected to the second connecting region of the arrester via at least one component, and
a fusible element of metallic material within the housing, the fusible element having first and second contact regions and a connecting region which connects the contact regions to one another,
wherein the first contact region of the fusible element is connected in an electrically conductive manner to the second connecting region of the arrester and the second contact region of the fusible element, in the normal state of the overvoltage protection device, is connected in an electrically conductive manner to the component,
wherein the connecting region is formed as a fusible link by material reduction such that short pulsed currents which result from overvoltages which are to be discharged from the overvoltage protection device are able to be transmitted via the connecting region, while in case of a fault line-frequency short circuit currents flowing via the overvoltage protection device, the connecting region is constructed so as to overload and be destroyed, and
further comprising a mechanical disconnector which is actuatable by a thermal overload in a manner that breaks the electrical connection between the second terminal and the component, and wherein the mechanical disconnector has a solder site and a spring element, the component remains in a position contacting the second terminal against the spring force of the spring element as long as the solder site does not melt.

13. The overvoltage protection device as claimed in claim 12, wherein the solder site is connected in a thermally conductive manner to the first arrester and also to the component.

14. The overvoltage protection device as claimed in claim 1, wherein the first connecting region of the first arrester rests on a bottom of the housing and the first terminal is formed by fastening sections on the housing via which the housing is connectable to a support plate as a busbar, the fastening sections projecting beyond the bottom of the housing.

15. The overvoltage protection device as claimed claim 1, wherein the housing is formed of two parts, the first housing part being pot-shaped and having a cavity which accommodates the arrester and the component and the second housing part being a housing cover which is insulated relative to the first housing part and is connected to the second terminal.

16. The overvoltage protection device as claimed in claim 15, wherein the second terminal has a terminal stud to which a second busbar is connectable by a screw.

17. The overvoltage protection device as claimed claim 7, further comprising an elastic support element within the housing in a manner surrounded by the connecting region of the fusible element, the support element being supported on the second contact region of the fusible element and on one of the second connecting region of the arrester and the second contact surface of the contact element.

18. The overvoltage protection device as claimed in claim 1, further comprising at least one of an optical status display and a remote indication apparatus for indicating the state of the overvoltage protection device located on the housing.

19. The overvoltage protection device as claimed in claim 12, further comprising an optical status display for indicating the state of the overvoltage protection device located on the housing; wherein the optical status display has a fixed first part and a movable second part, wherein the second part is movable by spring force of a spring element of the mechanical disconnector from a first position into a second position in the case of thermal overload breaking the electrical connection between the second terminal and the component, and wherein the housing has a viewing port through which the second part is visible in the first position of the second part and through which the first part of the optical status display is visible in the second position of the second part.

20. The overvoltage protection device as claimed in claim 19, further comprising a remote indication apparatus for indicating the state of the overvoltage protection device located on the housing, wherein the remote indication apparatus comprises a remote indication switch and a movable, spring-loaded plunger, the plunger being adapted to actuate the remote indication switch in the case of a thermal overload breaking the electrical connection between the second terminal and the component.

21. The overvoltage protection device as claimed in claim 20, wherein one end of the plunger adjoins the second part of the optical status display when the second part is in its first position so that the plunger is spaced apart from the remote indication switch against the spring force of a spring that spring loads the plunger and wherein the plunger is pressed against the remote indication switch by the spring force of the spring when the second part of the optical status display is in its second position.

22. The overvoltage protection device as claimed claim 1, wherein an arc extinguishing medium is located within the housing with which an arc can be extinguished.

* * * * *